United States Patent Office 3,476,246
Patented Nov. 4, 1969

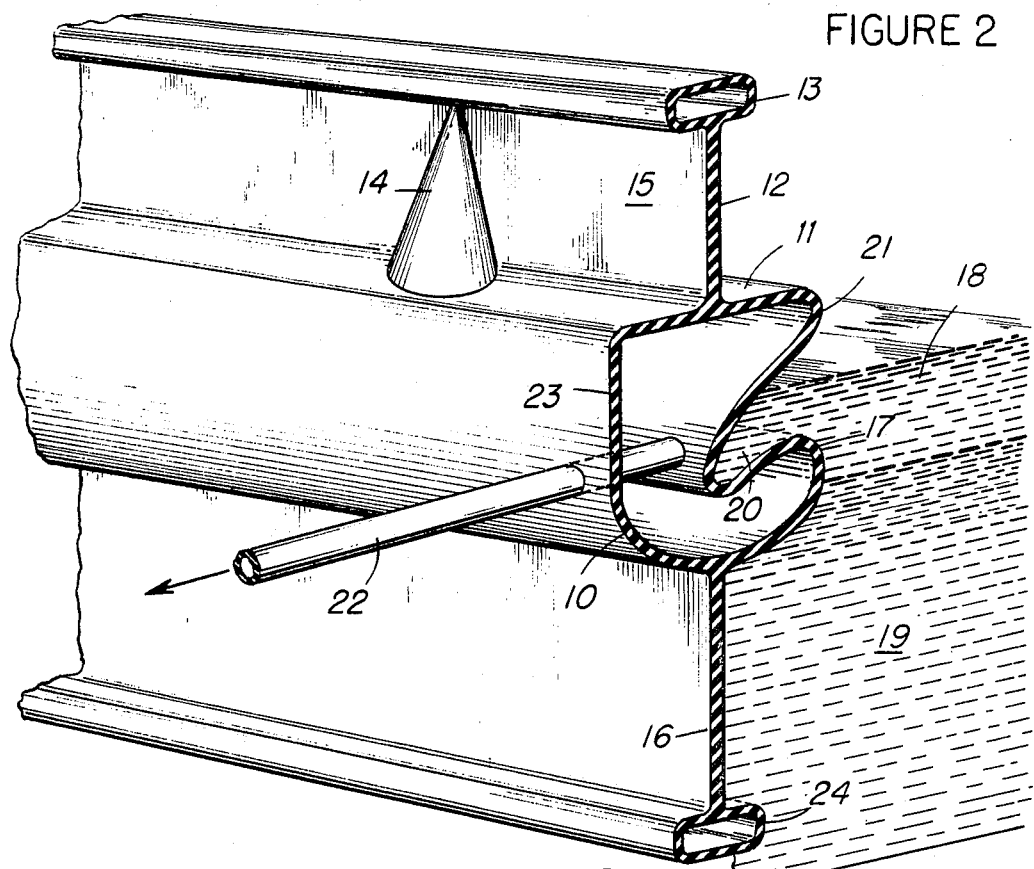
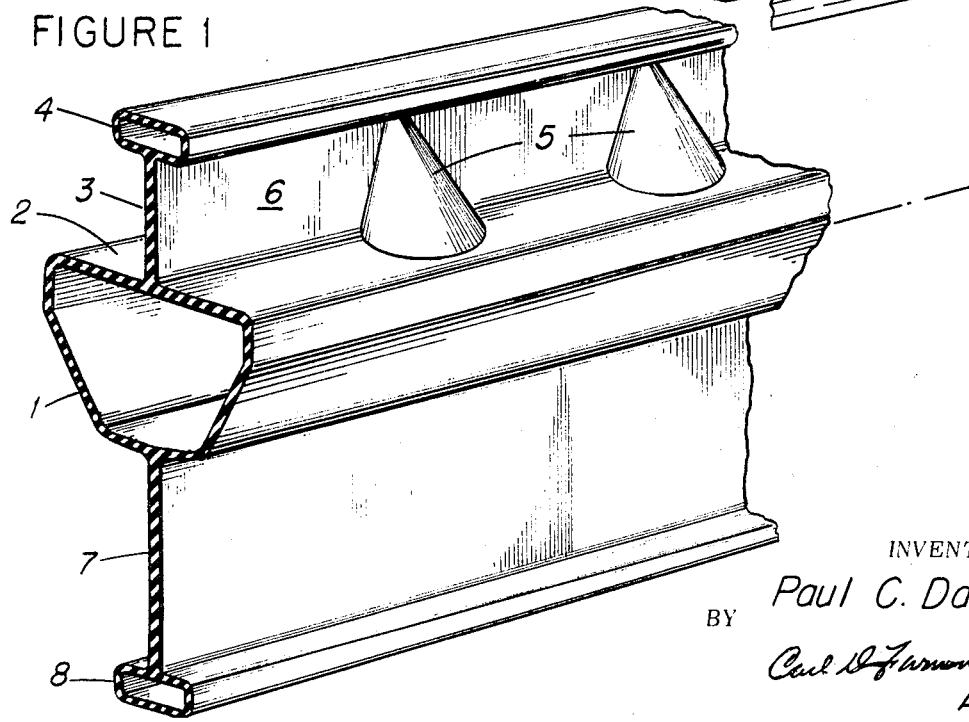

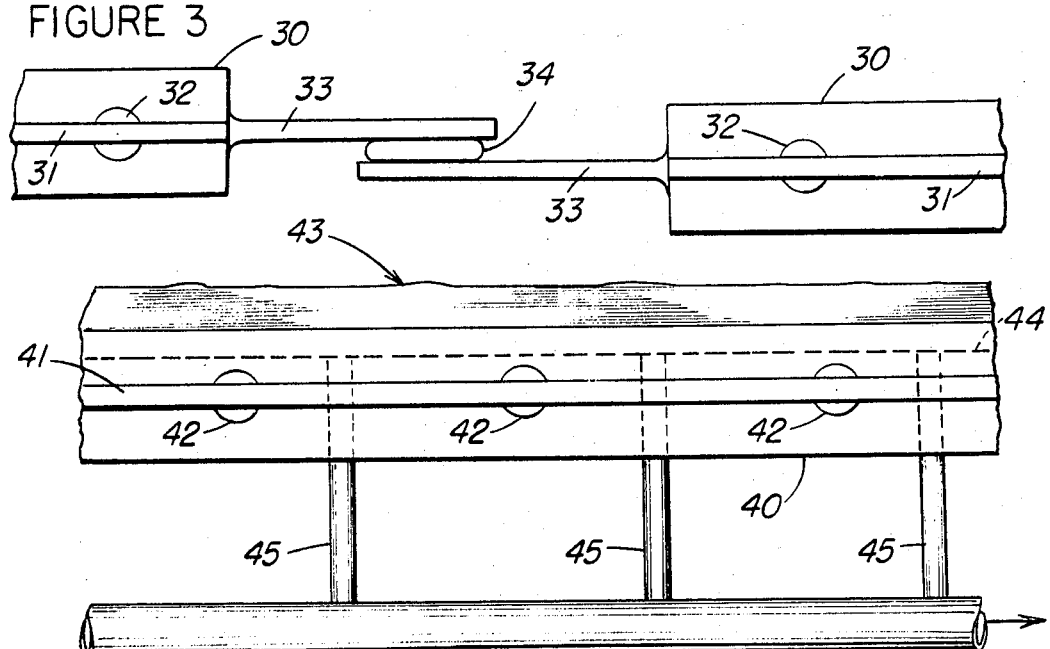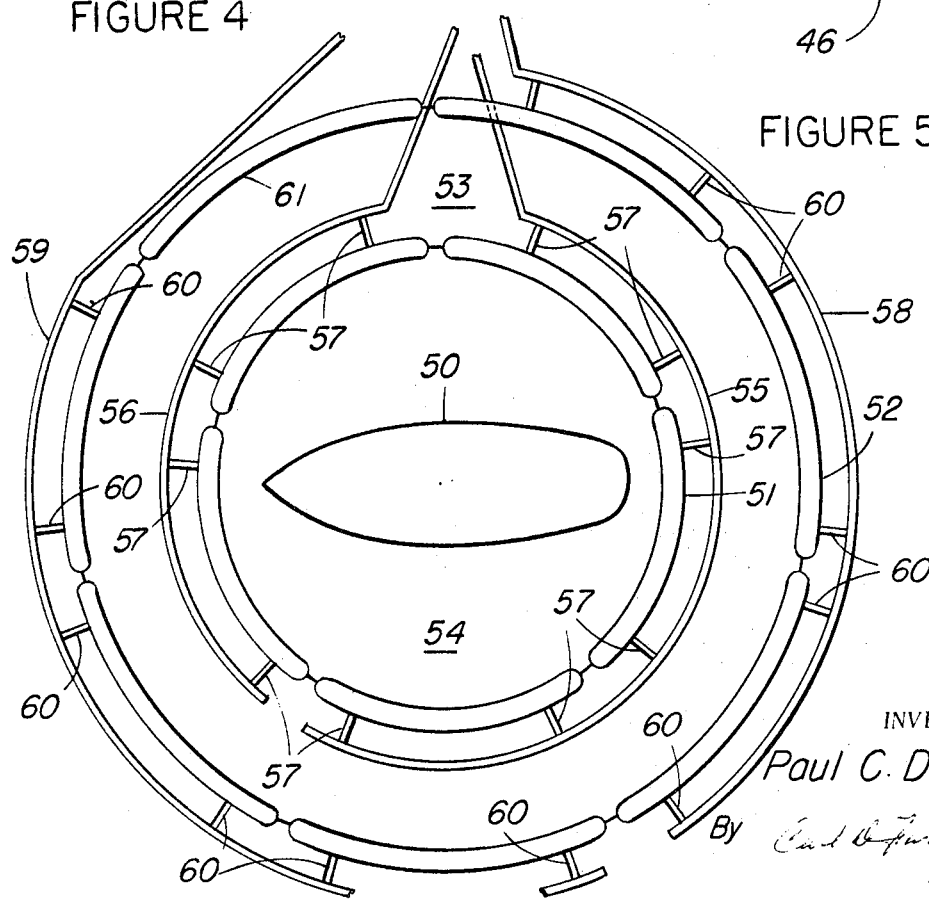

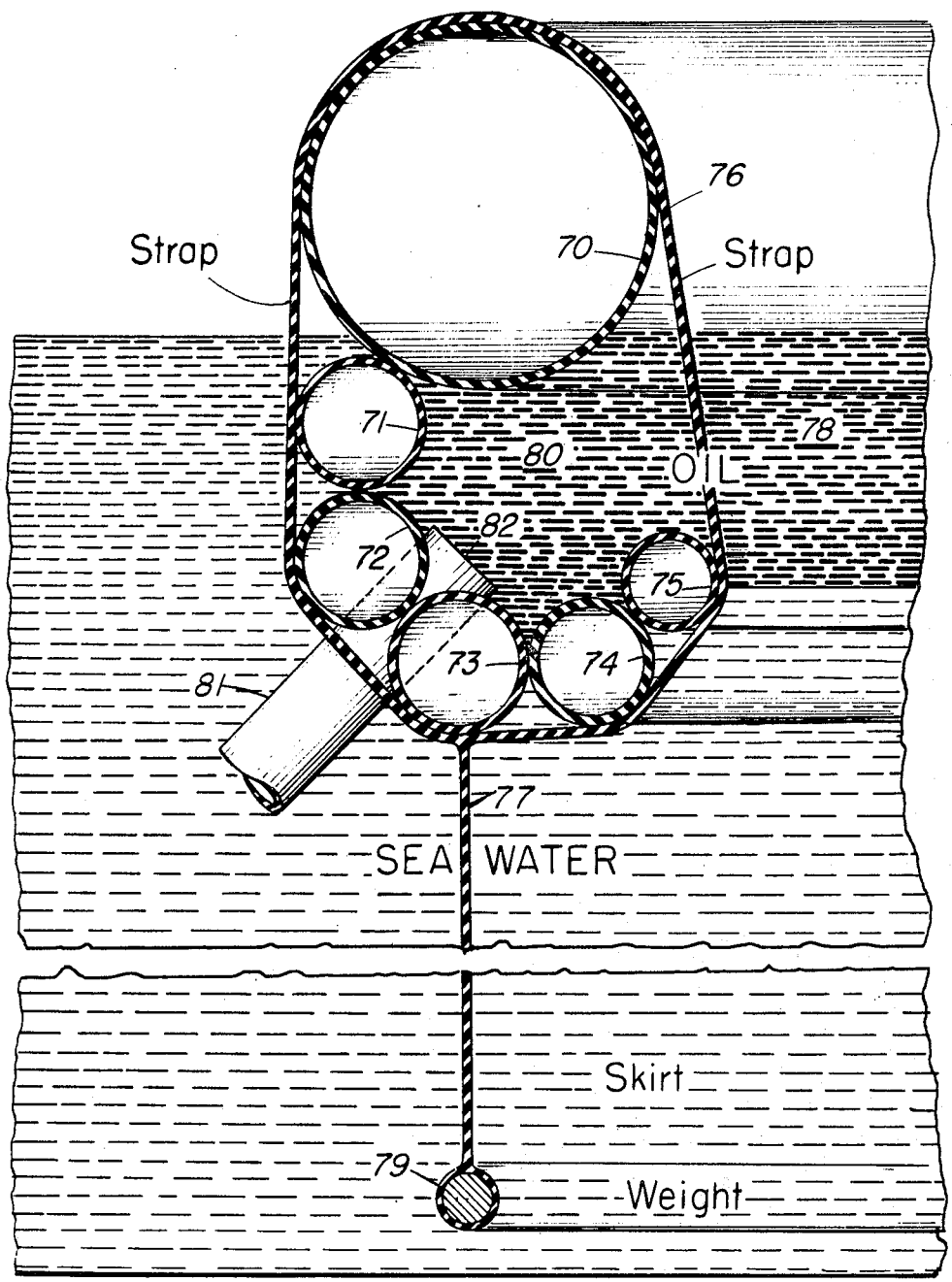

3,476,246
APPARATUS AND PROCESS FOR CONFINING FLOATING LIQUID PRODUCTS
Paul C. Dahan, Pittstown, Franklin Township, Hunterdon, N.J., assignor to Mobil Oil Corporation, a corporation of New York
Continuation-in-part of application Ser. No. 631,528, Apr. 17, 1967. This application Dec. 22, 1967, Ser. No. 692,897
Int. Cl. B01d 21/02, 21/24
U.S. Cl. 210—83                                      6 Claims

ABSTRACT OF THE DISCLOSURE

A floatable collar section comprising a main inflatable tube provided with means for skimming a floating liquid and a ballast means comprising a weighted skirt located below the inflatable tube. The skimming means can be formed with the main inflatable tube or can be attached thereto. A plurality of collar sections can be attached end to end forming a floatable collar to enclose and confine a liquid floating on seawater. The floatable collar is provided with means to recover a floating liquid.

REFERENCE TO RELATED APPLICATION

This application is a continuation-in-part of application Ser. No. 631,528, filed Apr. 17, 1967 now U.S. Patent 3,369,664.

BACKGROUND OF THE INVENTION

Field of the invention

At the present time, large seagoing tankers having storage capacities of a hundred thousand tons and more are employed in transporting liquid products such as crude oil or refined petroleum products. Liquid petroleum products constitute a dangerous pollution source should they leak from the tanker, since they have a density lower than seawater and will float and be spread over wide areas. These floating liquid products are a fire hazard in shipping lanes and can seriously pollute nearby land areas. Should these liquid products accidentally leak from the tanker, it is highly desirable to confine them to a relatively small area in order to facilitate their recovery, minimize pollution and restrict the possible fire hazard. This requires that the liquid product confinement be initiated as soon as possible after the leaking has occurred. To permit effective use, it is essential that the confining means be capable of withstanding the forces caused by the wave action of the open seas. Furthermore, it is desirable that the confining means be sufficiently compact to facilitate on-board storage and/or easy handling for quick transportation to the leakage site.

Description of the prior art

It is generally known that liquid products leaking from ships can be confined to a relatively small area by surrounding the ship with a floating collar which retains the floating collar which retains the floating liquid product within its confines. These prior art inflatable collars are usually reinforced with rigid strengthening means so that the deflated collars are not compact and thus require large storage areas and are difficult to handle and transport.

Thus, U.S. Patent 2,682,151 issued June 29, 1954, discloses a floating collar comprising attachable sections which can be formed into an enclosure surrounding a ship. Each section is comprised of a gas inflatable tube having a weighted skirt extending from the bottom of the inflated tube in a vertically downward direction. U.S. Patent 2,968,928 issued Jan. 24, 1961, discloses a similar arrangement in which the tube may be inflated with foam.

The inflatable collars disclosed in the prior art, including those shown in the above-cited patents, do not have any means for recovering the confined floating liquid and, consequently, removal of the confined floating liquid is time consuming and costly. Thus, it has been proposed to employ, in the confined area, small ships capable of skimming off and recovering the floating liquid. However, such an operation can be highly dangerous since the water depth in the area of the stricken cargo ship may well be too shallow to permit their use without risk of grounding. Furthermore, these small ships usually work in close proximity to the stricken cargo ship and, on the open sea, this introduces the danger of collision with its consequent damage.

Alternatively, it has been proposed to pump the floating liquid into cargo ships remote from the confined area through floating conduits placed in the confined area. However, in such an operation it is very difficult to selectively recover the floating liquid without pumping excessive amounts of seawater due to the difficulty in controlling the floatation level of the open end of the conduit, especially in the open sea.

The present invention provides a floatable collar formed by joining compact sections joined end-to-end to form a collar for confining floating liquid products on the sea. The collar, in its deflated state, is compact enough to permit on-board storage during periods of non-use. The present invention also provides floatable collar sections, and floatable collars formed therefrom, which are provided with means for selectively skimming and recovering floating liquids.

SUMMARY OF THE INVENTION

The present invention provides a floatable inflatable collar for confining to a small area, and subsequently recovering, liquids which are floatable on seawater. The collar comprises a plurality of attached inflated collar sections arranged to form an enclosure. Each collar section comprises an inflatable tube, with a skimming means formed therewith either as part of the main tube or attached to the main tube, and a ballast. The skimming means is in the form of a trough, the outer side of which functions to collect the floating liquid. The skimming means can be formed as a part of the main inflatable tube or can be formed separately and attached to the main inflatable tube. The outer side of the skimming means is of a height such that its upper edge is at, or above interface between the lower water phase and the floating liquid. Preferably the skimming means is constructed so that, in operation, it can be positioned above the interface and almost completely within the floating liquid phase. Conduit means are provided, in communication with the inside of the skimming means, to conduct the floating liquid from the confined area to a storage area. A ballast which is in the form of a weighted skirt, is attached to the collar, preferably to the lower portion of the skimming means. When the tube is inflated and floating, the ballast extends downward. The weighted skirt is made of flexible material with weights attached, preferably to the lowermost portion thereof. The weights cause downward extension of the skirt to a depth which will minimize or prevent escape of liquid product even under the force of the open sea.

Optionally, the inflatable tube can have attached thereto an inflatable bulwark, which when inflated, extends vertically upward of the main inflatable tube. Inflatable ribs can be formed at spaced intervals along the length of the bulwark to maintain the latter in an upwardly extended position. The inflatable ribs extend from the bulwark tube downward to the main inflatable tube. For convenience, the interiors of the ribs and the bulwark tube and/or the main tube can be in open fluid communication so that a common inflating means can be used to concurrently inflate ribs and tubes. In its inflated state, the bulwark provides a semi-rigid wall supported by both the bulwark tube and the ribs. The bulwark prevents or minimizes overflow of liquid product from the enclosed area. In its deflated state, the bulwark construction is flexible and thus it can be rolled or folded into a compact form to permit easy storage. The ribs should be spaced so as to provide rigidity to the bulwark without interfering with requirements for compactness. Depending upon the height of the bulwark, the materials of construction and anticipated conditions during use, ribs, at intervals of about 4 to about 15 feet or more usually about 6 to 10 feet, will be adequate of both strength and compactness requirements. When the collar is not in use, it can be compressed into accordion shape and then wound on a reel, or folded for storage.

BRIEF DESCRIPTION OF THE DRAWINGS

FIGURE 1 is an isometric view in cross-section of a collar section which can be employed with the collar sections of this invention to form a collar.

FIGURE 2 is an isometric view in cross-section of a collar section wherein the skimming means is formed as a part of the main inflatable tube.

FIGURE 3 is a top view of one means for attaching two collar sections whereby leakage of liquid product between collar section is minimized.

FIGURE 4 is a top view of the embodiment of FIGURE 2 wherein means are provided for removing liquid product from the confined area.

FIGURE 5 is a top view of one means for practicing the present invention wherein two collars, each made up of a plurality of collar sections, are employed to surround and confine floating liquid product.

FIGURE 6 is a side view of a collar section having the skimming means attached to the main tube.

DESCRIPTION OF SPECIFIC EMBODIMENTS

Figure 7:
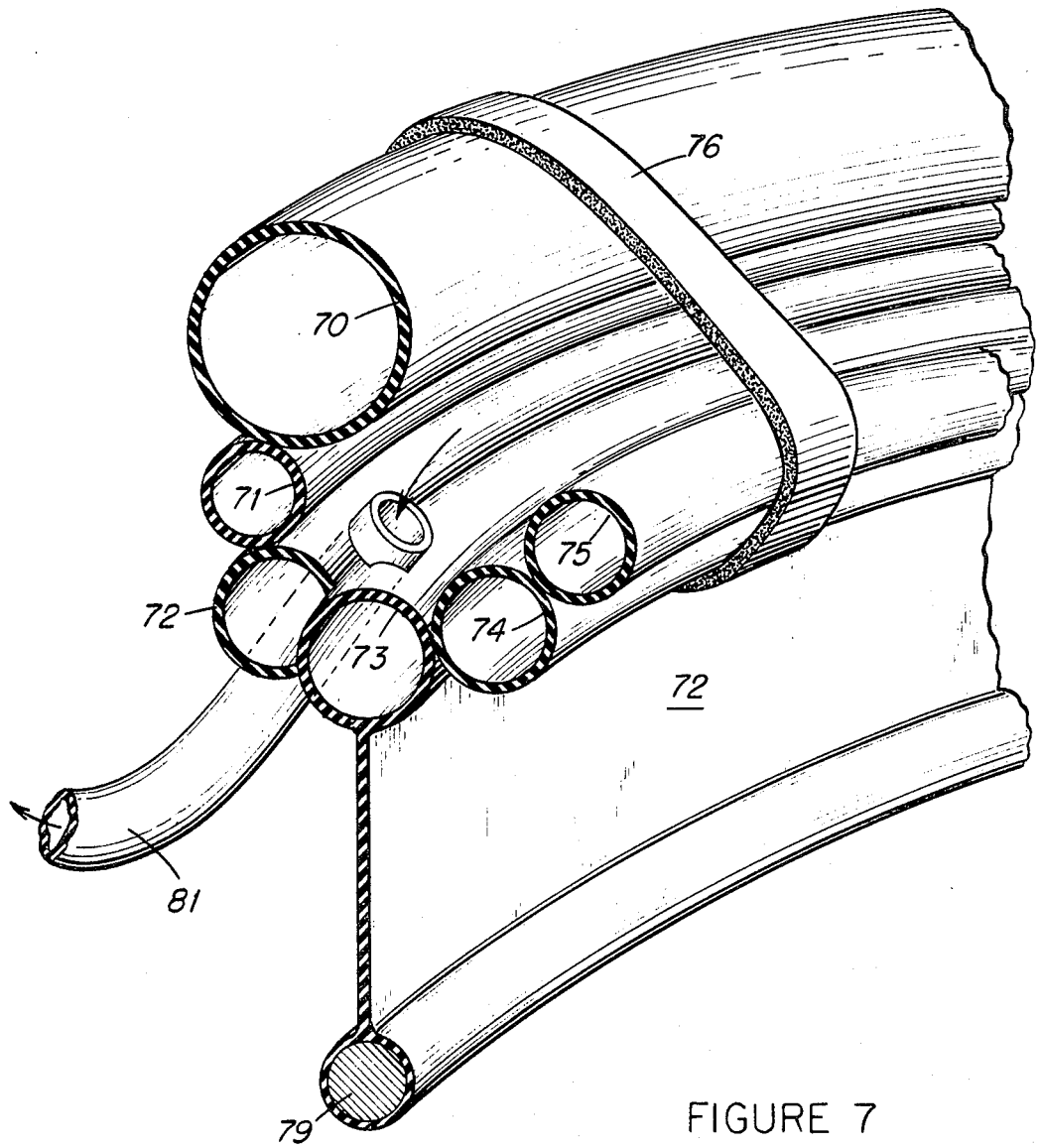
FIGURE 7 is a top isometric view of the collar section shown in FIGURE 6.

Referring to FIGURE 1, a collar section is shown in its inflated state. The collar section comprises an inflated tube 1 made of a flexible waterproof material. To the top surface 2 of tube 1 is attached a bulwark 3 comprised of flexible waterproof webbed or sheet material which extends the length of tube 1. To the top portion of the bulwark 3 is attached an inflatable waterproof bulwark tube 4 which extends the length of bulwark 3. At spaced intervals along the length of tube 1 are located strengthening inflatable ribs 5. The ribs 5 extend from the top surface 2 of tube 1 to the bulwark tube 4 and are attached to the wall 6 of bulwark 3. The interior of ribs 5 can be in fluid communication with both the interiors of tube 1 and bulwark tube 4 or can be in fluid communication with the interior of either tube 1 or bulwark tube 4. The ribs 5 provide strength to the bulwark 3 to maintain it in vertical position above tube 1.

The dimensions of the bulwark 3 and tube 1 are such as to provide an effective barrier to floating liquid product, while not seriously adversely affecting the compactness of the collar section structure. It is desirable that tube 1 be of a vertical height of from about 3 to about 10 feet and more usually between about 4 and 6 feet. The width of tube 1 at its widest point is in the range of from about 3 to about 10 feet and more usually between about 4 to 7 feet. It is to be understood that the tube 1 on bulwark tube 4 can be of any desired cross-sectional shape as for example circular or elliptical.

To the underside of tube 1 is attached a skirt 7 made of flexible waterproof material which extends the length of tube 1. The vertical height of the skirt 7 is also such as to provide an effective barrier to floating liquid product while not seriously affecting the compactness of the collar section structure. The skirt vertical height can be between about 7 and about 15 feet and more usually between about 8 and 11 feet. To the bottom of skirt 7 is attached a tubular means 8 for retaining weights which extend the length of skirt 7. The weights can be in any convenient form which permits the collar section to be rolled on a reel as for example a chain, granular metal particles or solid weights at spaced apart intervals along the length of tubular means 8. The use of weights in tubular means 8 permit a relatively stable vertical extension of skirt 7 in a downward direction.

Referring to FIGURE 2, to the top surface 11 of tube 10 is attached a bulwark 12 which extends the length of tube 10. To the top portion of bulwark 12 is attached an inflated bulwark tube 13 which extends the length of bulwark 12. At spaced apart intervals along the length of tube 10 are located strengthening inflated ribs 14. The ribs extend from the top surface 11 of tube 10 to the bulwark tube 13 and are attached to the wall 15 of bulwark 12. The interior of ribs 14 can be arranged in fluid communication as described for ribs 5 in FIGURE 1

The dimensions of the bulwark 12, tube 1 and skirt 16 are such as to provide an effective barrier to floating liquid product in the open seas while not seriously adversely affecting the compactness of the collar section structure and can have the dimensions described for FIGURE 1.

The tube 10 is of "J" or "hook" cross-sectional shape with the curved portion 17 being located on the side of the tube which is adjacent the floating liquid product. The shape of tube 10 provides a trough, the outer side of which forms a skimming means for removing, retaining and recovering floating liquid product 18. The hook 17 is located below the surface of floating liquid product and provides a partial barrier to seawater 19 while permitting liquid product 18 to enter trough 20. To the wall 21 of tube 10 is attached a flexible conduit 22 or a plurality of flexible conduits which extend through wall 23 and which are in fluid communication with the liquid product 18 in trough 20. Suction can then be applied to conduit 22 to withdraw floating liquid product 18 from the enclosed area to storage means including ships not shown.

To the bottom of tube 10 is attached a skirt 16 which extends the length of tube 10 and provides an effective barrier to liquid product 18. To the bottom skirt 16 is attached a tube means 24 adapted to retain weights in a manner described above for FIGURE 1.

Referring to FIGURE 3, means for attaching adjacent collar sections to provide an enclosure about the leaking area are shown. The collar sections 30 having bulwark tubes 31 and ribs 32 are provided at their ends with flexible seal flaps 33. The seal flaps are made of a flexible waterproof material and can be part of a unitary construction with the collar sections 30. In attaching the collar sections 30, an inflatable seal is placed between the seal flaps 33. The inflatable seal 34 is tubular shaped and is equipped with a weighted skirt such as is shown in FIGURES 1 and 2. The seal flaps 33 are located on opposing sides of inflatable seal 34 and are lashed into position in any convenient manner as for example by ropes or chains. By employing the means shown by FIGURE 3, leakage of floating product between adjacent collar sections is minimized.

Referring to FIGURE 4, a top view is shown of one means for removing and recovering floating liquid product. A collar section 40 of FIGURE 2 having a bulwark tube 41 and ribs 42 is employed to confine a floating liquid product 43. The liquid product is separated from seawater by a hook-shaped skimming means 44 and recess such as described for FIGURE 2, 6 and 7. The liquid product is withdrawn through conduits 45 and into a main flexible conduit 46 under suction applied to conduit 46. The conduits 45 and 46 are flexible and are adapted to float on the sea surface. The liquid product is directed from conduit 46 to a storage area not shown which is usually a ship equipped with means for applying suction to conduit 46.

Referring to FIGURE 5, a ship 50 from which floating liquid product is leaking is surrounded by two relatively concentric floating collars 51 and 52. Each floating collar 51 and 52 is formed by a plurality of collar sections such as shown in FIGURES 2, 6 and 7 and the collar section 61, shown in FIGURE 1. The collar sections can be attached by the lashing means shown in FIGURE 3 or in any well-known manner as for example with hooks. The collars 51 and 52 are formed by placing a deflated collar section in the water and then inflating the collar section. The main conduits 55, 56, 58 and 59 are attached to the auxiliary conduits 57 and 60 and to storage areas not shown. The inflating can be accomplished by having attached to the collar section a compressed gas inflating device such as well-known $CO_2$ or nitrogen cartridges or the like which release compressed gas by simply pulling a line. The compressed gas cartridges can form part of the collar section construction in a manner which permits their replacement after use. Each collar section is also provided with valve means for releasing gas from the collar section after use. Inflation of the main tube and, when employed, the bulwark tube and ribs for each collar section can be accomplished simultaneously with one or a plurality of inflating means. Furthermore, inflation of the main tube can be accomplished independently of the inflation of the bulwark tube and ribs, when employed. The collar sections are then attached to enclose the liquid product leaked from the ship. One collar 51 can be employed to enclose the ship 50 or a number of relatively concentric collars such as collar 52 can be employed in conjunction with collar 51 to exercise improved confinement of liquid product to a relatively small area.

Once the collar sections are attached to form an enclosure around the ship 50, it is desirable to anchor the collars 51 and 52 to prevent their being battered against the ship by the force of the sea. The floating liquid in area 54 is removed through main conduits 55 and 56 which are attached to auxiliary conduits 57 which are in turn in communication with area 54. Tht floating liquid in area 53 is removed through main conduits 58 and 59 which are attached to auxiliary conduits 60 which are in turn in communication with area 53.

Referring to FIGURES 6 and 7, a main inflatable tube 70 is provided to which is attached a skimming means formed of a plurality of inflatable tubes 71, 72, 73, 74 and 75. The skimming means is formed into a trough having a hook shape when viewed as a vertical cross-section. The skimming means is held to the desired shape during use by strap 76. To the strap 76 and the underside of inflatable tube 73 is attached a skirt 77 which extends the length of the tube 73 and provides an effective barrier to the floating oil 78. To the bottom of skirt 77 is attached a tube means 79 adapted to retain weights in a manner described above for FIGURE 1. The skimming means is shaped so that inflatable tube 75 provides a barrier to seawater but permits floating oil products to enter the recess 80 formed by the skimming means. A flexible conduit 81 is attached to the exteriors of tubes 72 and 73 and the open end 82 thereof is in communication with the oil within recess 80. The oil is pumped from recess 80 through tube 81 to storage means not shown. The tubes 70 through 75 are attached in a manner to prevent leakage from recess 80 into the seawater. Thus, for example when the inflatable tubes are made of rubber, the tubes can be attached by vulcanization.

The bulwark construction when employed, provides substantial advantages not present in prior art constructions. In its deflated state, the bulwark, as well as the remainder of the collar, is flexible which provides for easy storage. In use, the bulwark provides an effective means for preventing leakage of liquid product while not substantially adding to the buoyancy of the collar section. When the buoyancy of the collar is excessive, it will become cork- like in the open sea and will be easily lifted from the water by the wave action. This is undesirable since loss of liquid product is effected thereby.

It is within the scope of the present invention to further control excessive buoyancy of the collar by providing the outside walls of the main tube with sponge-like material capable of absorbing water as for example expanded polymeric materials including foamed polyurethane or polystyrene. The foam material can be retained against the outside tube wall by a sheet material having a plurality of holes therein and attached to the outside main tube wall. In this manner, the disadvantages resulting by excessive buoyancy are further reduced.

The materials employed in the construction of the collar should be flexible, waterproof and have adequate strength to resist the force of waves. Sheet or webbed nylon, heavy duty rubber and rubberized canvas which may or may not be reinforced with flexible glass or metal fibers or cables, are examples of materials which can herein be employed.

What is claimed is:

1. An elongated inflatable section formed of flexible material and adapted to float on water comprising a main inflatable tube section, vertically extending seal means positioned on each end of said section, ballasting means attached to and extending downwardly from the underside of said section to cause the section when inflated and floating to maintain a predetermined attitude in water, a trough formed in one side of said tube section, and said trough being arranged to collect material floating on the surface of the water supporting said section.

2. The inflatable section of claim 1 wherein the trough is formed as an integral part of the main inflatable section.

3. The inflatable section of claim 1 in which the ballasting means comprises a weighted flexible skirt extending the length of said tube, and an inflatable bulwark is attached to and extends above said inflatable section in a position substantially diametrically opposite to said skirt.

4. A floating collar adapted to retain floating liquid in a confined area, said collar being formed by joining in end-to-end relationship a plurality of the inflatable sections of claim 1.

5. The inflatable section of claim 1 in which the trough is formed by a plurality of elongated inflatable tubes adjacently positioned horizontally one to another and held in trough like position beneath said main inflatable tube by suitable strap means.

6. A method for recovering liquid floating on the surface of water which comprises attaching in end-to-end relationship a plurality of elongated buoyant tubes with seal flaps on each end thereof and a ballasting skirt extending downwardly from said tube beneath a surface skimming trough formed with one side of said tube to form an enclosure about the floating liquid, collecting the thus confined floating liquid in said trough from said water surface and recovering the collected liquid from the trough by one or more liquid withdrawal tubes.

References Cited
UNITED STATES PATENTS

| | | | |
|---|---|---|---|
| 882,030 | 3/1908 | Traulsen et al. | 210—242 |
| 2,682,151 | 6/1954 | Simpson et al. | 61—1 |
| 2,968,928 | 1/1961 | Wicklander | 61—1 |
| 3,319,264 | 5/1967 | Scarano | 210—169 X |

FOREIGN PATENTS 911,963   12/1962   Great Britain.

REUBEN FRIEDMAN, Primary Examiner

JOHN ADEE, Assistant Examiner

U.S. Cl. X.R.

61—1; 210—242